Figure 1:
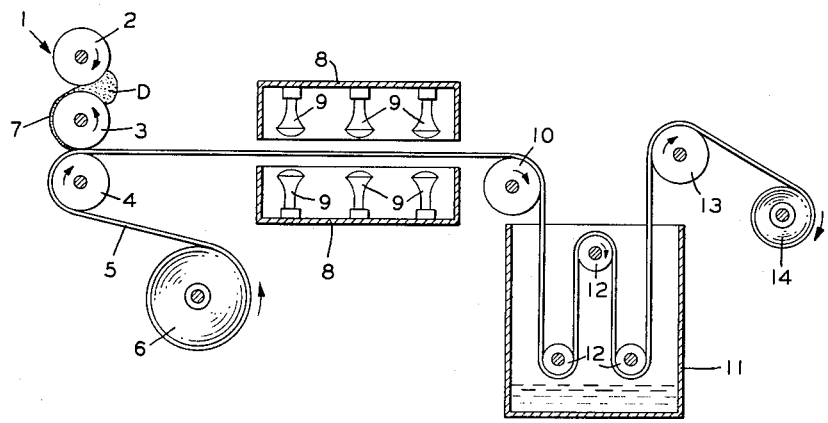

Feb. 13, 1962 R. SMITH-JOHANNSEN 3,020,597
METHOD OF MAKING MICROPOROUS FILM
Filed July 3, 1953

*INVENTOR.*
ROBERT SMITH-JOHANNSEN
BY
ATTORNEYS

United States Patent Office 3,020,597
Patented Feb. 13, 1962

3,020,597
METHOD OF MAKING MICROPOROUS FILM
Robert Smith-Johannsen, Niskayuna, N.Y., assignor to S-J Chemical Company, Niskayuna, N.Y., a copartnership
Filed July 3, 1953, Ser. No. 367,217
11 Claims. (Cl. 18—57)

This invention relates to the production of microporous products from plastic compositions and more particularly to an improved process for producing the same by fusing fine particles of thermoplastic material while dispersed throughout a continuous inert matrix material and then dissolving out the continuous inert material. The resulting products of the invention are useful as battery separators and filters or as sheets, films, or other shapes for use wherever microporosity is necessary or desirable.

According to the present invention, microporous films of uniform porosity are produced by thoroughly dispersing a finely divided thermoplastic powder of controlled particle structure throughout a high viscous, inert and incompatible medium which is maintained as a continuous phase. The dispersion is then heated to the fusion temperature of the thermoplastic particles to effect fusion thereof. The inert material is then leached out by a suitable solvent which will dissolve the inert material without dissolving or affecting the fused thermoplastic particles.

The films resulting from the novel fusing process according to the present invention show visible evidence that the film has been made according to the present invention. The small thermoplastic particles are fused together at their original points of contact without any sagging or densification of the film. The particles are also uniformly dispersed throughout the thickness of the film and thus produce a film with a uniform porosity. The very fine thermoplastic particles, after they have been fused, consist of bonded sphere-like particles, and generally maintain their original size and shape and are still visibly recognizable as such after the film has been formed. The films, when used as filters, also show a unique tendency for the filtered material to collect at the surface with very little penetration into the body of the film.

Any finely divided thermoplastic material or materials which will remain thermoplastic sufficiently long to allow fusion before the occurrence of curing which renders the material unfusible can be used to form the microporous films according to the present invention. The particular thermoplastic material used will of course depend upon the ultimate use to which the resulting film is to be put. For example, it is necessary that the thermoplastic particles melt or fuse at a higher temperature than the film will be subjected to in use, so that the particles may be fused during the manufacturing process and hold together at temperatures at which the film will be subsequently exposed.

An important feature, according to the present invention, is the viscous nature of the inert medium or matrix material throughout which the finely divided thermoplastic particles are dispersed. By using a highly viscous inert matrix material, which is also maintainable in a highly viscous state at the fusion temperature of the particles of the thermoplastic powder, the individuality of the original particles is maintained throughout the fusing operation and coalescing of the particles into larger aggregates is prevented. The particles fuse together at their original points of contact and generally maintain their original size and identity which may be visibly observed by examination of the microporous film with a high-powered microscope. The thermoplastic particles also remain uniformly distributed throughout the thickness of the film, thus producing a microporous film having a uniform density and porosity. By using the highly viscous matrix material according to the present invention, the thermoplastic particles are also prevented from sagging during the fusing operation and densification of the film is prevented. The role of the inert viscous medium is further to permit the fusion of the particles together without allowing them to sinter together during the fusing operation. The quality of the resulting microporous films also depends upon accurately controlled fusion of the particles, and by dispersing the particles throughout a viscous inert medium which is a continuous phase, very accurate control of the fusing operation is easily obtained.

Another advantage of the present invention is that the very small thermoplastic particles can be fused together to produce microporous films of uniform porosity and without coalescing of the individual particles. In methods heretofore employed for producing microporous films, there is a definite lower limit in each case of the size of the particles usable to form the microporous film, while according to the present invention there is no practical limit to the particle size of the thermoplastic particles used to form the microporous film. In prior methods attempts to produce microporous films from small particles resulted in coalescing of the particles during fusion. Coalescing of the particles during the fusing or sintering operation resulted in films of a non-uniform porosity containing relatively large holes which rendered the films unfit for the practical uses to which microporous films are applied. The process of the present invention is capable of producing microporous films from very small plastic particles without coalescing of the particles during the fusing operation. Microporous films using thermoplastic particles as small as 0.15 micron and below have been produced in accordance with the present invention. The films thus produced were uniform in porosity and density, and the fused particles generally maintained their original size and identity, and remained uniformly distributed throughout the thickness of the resulting microporous film.

I have found that by using a thermoplastic powder having particle size range of 0.2 to 20 microns, advantageous results are obtained. Somewhat smaller or larger particles may be used if desired within the scope of the present invention.

Another advantage of the present invention is that it permits the production of the microporous films having a wide range of thickness while maintaining uniform porosity and density throughout the thickness of the film. Prior processes for making microporous films have been limited in the range of thicknesses producible thereunder, while maintaining small and uniform pores which will allow free passage of an electrolyte when the films are used as battery separators. According to the present invention, small and uniform pores can be produced independent of film thickness. Microporous films have been produced according to the present invention having a thickness in the range of from 0.5 mill and below to 500 mills and above. The films thus produced were uniform in porosity and density throughout the film thickness and the fused particles generally maintained their original size and identity.

As hereinbefore pointed out, the inert matrix material according to the present invention must be highly viscous. It has been found that in order to obtain the advantages of the present invention as noted above, the inert matrix medium must have a viscosity from about 20,000 centipoises to about 2,000,000 centipoises measured at the temperature used to fuse the particular thermoplastic particles used to form the films. If the inert matrix material has a viscosity much below 20,000 centipoises, or 100,000 centipoises at room temperature, it is not sufficiently viscous to prevent coalescence of the thermoplastic particles with consequent non-uniform porosity and large holes in the resulting film. If the viscosity of the matrix material is much in excess of 2,000,000 centipoises, or 100,000,000 at room temperature, such materials become too difficult to leach out. I have found it advantageous to use a matrix material having a viscosity between 50,000 and 500,000 centipoises.

The matrix material must meet other requirements imposed by the manufacturing process. Thus it must be readily soluble in a suitable solvent in which the thermoplastic powder used to form the film is insoluble. It must not become insoluble at the fusion temperature of the thermoplastic resin. The thermoplastic resin must not be soluble in the matrix material and must remain insoluble therein even at the fusion temperature of the resin. The matrix material must be chemically stable and must not lose any of its necessary properties at the fusion temperature of the resin. The matrix material must also remain sufficiently viscous at the temperature used to effect fusion of the resin and should not have a viscosity of much below 20,000 centipoises at that temperature. It must also be chemically inert with respect to the thermoplastic material so that it will not react with the resin or cause lasting contamination thereof either at ordinary temperatures or at the fusion temperature. I have discovered that very viscous, inert and soluble gums or oils of polyorganosiloxanes, and polyisobutylene are particularly advantageous as the inert matrix medium. Chlorofluoropolythene could be used where fusion temperatures are very low.

Because of the above-noted considerations, the particular viscous matrix medium used will depend somewhat on the particular thermoplastic resin use to form the microporous film. For example, a finely divided powder of a high molecular weight, such as monochlorotrifluoroethylene, should not be dispersed in an oily, not-so-high molecular weight polymer of the same monomer, since it would be dissolved in the oil before fusion could take place. On the other hand, a finely divided low melting point powder of polyvinyl chloride could be successfully fused in an oily low molecular weight polyisobutylene, since it is insoluble in it and meets all the requirements of a matrix medium for use with polyvinyl chloride in accordance with the invention. A dispersion of finely divided monochlorotrifluoroethylene particles does not form a satisfactory microporous film when fused in a matrix of polyisobutylene because during the high temperature of fusion undesirable reactions take place in the polyisobutylene and its viscosity is usually reduced sufficiently to fall outside the range required according to the present invention.

Some of the various thermoplastic materials which may be utilized in forming the microporous films of the present invention are: acrylate, methylmethacrylate, polyvinyl acetate, polyvinyl chloride acetate, polyvinyl chloride, ethyl cellulose, polystrene, polystrene-butadiene and chlorinated rubber. Polyisobutylene and siloxane polymers are examples of suitable inert matrix materials which may be used with the above-named thermoplastics. When using these matrix materials, solvents such as aliphatic hydrocarbons, hexane, mineral spirits, and the like, may be used to extract the matrix materials without affecting the thermoplastic particles. Other examples of thermoplastics which may be utilized are: casein, vinylidene chloride, cellulose acetate, cellulose propionate, cellulose acetate butynate, cellulose nitrate, polyvinyl formal, polyamide, shellac (and other natural resins), polyvinylacetal, polyethylene, and polytrifluoromonochloroethylene. Polyisobutylene, and siloxane polymers may also be used with these thermoplastic materials as matrix materials, and hydrocarbons, hexane, mineral spirits, toluol, xylol, are examples of solvents which may be utilized to leach out the matrix materials when using the latter-named thermoplastics.

The term "siloxane polymers" as used in the above table includes hydrocarbon siloxane polymers such as methyl, ethyl, and methyl phenyl siloxane where there are approximately 1.9 to 2.01 alkyl and aryl groups for each silicone atom in the molecule. Halogenated hydrocarbons such as trichlorethylene can also be used as hydrocarbon solvents.

The above tabulation is of course not to be considered as limiting since other thermoplastic materials aside from those listed above may be used without departing from the present invention. Other matrix materials may also be used with the particular thermoplastic resins noted so long as they meet the requirements herein specified.

In order to obtain fusion of the individual particles dispersed through the continuous inert matrix material according to the present invention, the volume concentration of the thermoplastic particles to be fused must be above a certain limit, otherwise no fusion takes place between the particles. The minimum volume concentration of the thermoplastic particles cannot be exactly defined because it depends on the particle size distribution of the thermoplastic particles being fused. Generally, however, the volume concentration of the thermoplastic particles must be about 30% or above based on the total volume of the thermoplastic particles and matrix material. This approximate minimum of 30% can only be obtained however, if thermoplastic particles of fairly uniform size are used. If the size of the particles of the particular thermoplastic powder being fused varies to any great extent, the minimum concentration of the thermoplastic powder necessary to effect fusion thereof will accordingly be increased. For example, if the particular thermoplastic powder being fused is composed entirely of particles of close to 1 micron in diameter, the minimum concentration of such a powder would be about 30%. However, if the particle size of the thermoplastic particles varied from about 1 micron to about 50 microns the necessary volume concentration of the thermoplastic powder would have to be in excess of 30% in order to effect fusion of the particles. The upper or maximum concentration depends upon the degree of porosity desired in the resulting microporous film. I have found that the maximum amount of resin of fairly uniform particle size which can be used and still produce a microporous article in accordance with the present invention is approximately 75% by volume. Above this concentration the individual particle-to-particle fusion begins to diminish substantially and the particles lose their original size and identity. It is advantageous to use a thermoplastic powder of uniform particle size in order to accurately determine beforehand the minimum concentration necessary and also to produce films of uniform porosity. When using particles of uniform size, I have found it advantageous to use a volume concentration from about 30% to about 50% of the thermoplastic powder.

Generally, the dispersions prepared according to the present invention are heated to the fusion temperature of the resin or above long enough for the fusion to take place. Depending upon the temperature required, the thickness of the films and the characteristics of the heating device, the heating cycle will vary between 20 seconds and 2 minutes. For example, a polyamide such as nylon requires a temperature of 500° F. for 30 seconds to effect fusion of the particles, and a vinylchloride-acetate copolymer requires a temperature of 400° F. for about 40 seconds. The films may be heated in any manner desired such as by circulating hot air or infra-red heat.

In the production of thin films on the order of 1 mill in thickness and below, I have found it advantageous to effect fusion of the plastic particles while dispersed throughout the continuous inert medium in the shortest time possible. The plastic particles should be subjected to a temperature sufficiently high to effect fusion thereof in about 15 seconds. The particular temperature used to effect fusion in a short period of time will of course be dependent upon the particular thermoplastic material used. If such thin films are subjected to temperatures capable of causing fusion of the plastic particles for much in excess of 15 seconds, the pore size becomes non-uniform and larger pores are developed than would be developed during a short fusing period. By using a short fusing period in producing thin films, small and uniform pores are maintained. When films are produced of a thickness above one mill, no such problem is presented. Films on the order of 5 mills in thickness, for example, can be heated at or above the fusion temperature of the particular thermoplastic resin used for considerable lengths of time, such as 2 to 5 minutes, without any modification of the pore size resulting, and the microscopic pores remain uniform.

A further and important factor controlling the quality of the finished microporous film is the particle size of the original thermoplastic particles. The pores or voids of the film will be in the general order of the size of the particles themselves. When producing microporous films for use as battery separators, it is advantageous to use thermoplastic particles having a particle size between about 1 and 3 microns. The particular thermoplastic powder used may of course contain individual particles measuring in size from about 1 to 3 microns but as hereinbefore pointed out, it is also advantageous to have the individual particles of the particular resin used as nearly uniform in size as possible. Thermoplastic particles of a size larger than about 10 microns produce pores big enough to permit penetration of active material from the battery plates, while particles of much smaller size, in the range of .01 to 0.1 micron, gives pores so small that the electrolytic resistance is seriously increased. In microporous films for other applications, however, the particle size range may be from about 0.01 to about 50 microns.

The microporous films produced according to the present invention may be formed by a variety of procedures. The dispersion may be calendered directly on a backing material such as glass or nylon fabric, and after fusion of the thermoplastic particles and leaching out of the continuous inert medium, remain attached to the backing material which will act as a reinforcing member for the microporous film. A film comprising a dispersion of the present invention may also be calendered on a release surface such as a silicone resin or polyethylene film, and after fusion of the thermoplastic particles and leaching out of the inert medium, may be stripped from the release surface to form a nonreinforced microporous film. The dispersion may also be knifed or molded on a reinforcing surface or a release surface. The dispersion can also be dip coated onto a backing material, or applied with rolls, in the form of a dispersion of thermoplastic particles in a solution of the matrix material. When using this method, a solvent is added to the dispersion which will dissolve only the inert matrix and not the thermoplastic particles. The backing material is then dipped into the dispersion to form a coating on the backing. The solvent is then evaporated from the film and the resulting film is fused and leached out in the usual manner, according to the present invention.

When forming the micro-porous films on a reinforcing backing material, the backing material is desirably at least as porous as the microporous film itself. The backing material may be woven or non-woven fabric. If the contemplated use of the microporous film on a reinforcing backing material is as a battery separator, the backing material must also be chemically inert in the battery fluid. Glass cloth may be used in an acid type battery while a polyamide or vinyl chloride—vinyl acetate copolymer could be used in an alkaline type battery. The microporous films produced according to the present invention may also be applied directly to the battery plates themselves by applying the dispersion to the battery plate in any desired manner and thus fusing the resin particles and leaching out the inert material.

*Example 1.*—20 parts by weight of a polyisobutylene, having a viscosity of about 50,000 centipoises at 200° C. is dissolved in 60 parts by weight of ethylene trichloride to form a polyisobutylene-ethylene trichloride solution. 20 parts by weight of a polyvinyl chloride resin (B. F. Goodrich "Geon 126") with 99 percent of the particles passing through a 200 mesh screen and about 95 percent of the particles passing through a 325 mesh screen is then thoroughly dispersed throughout the polyisobutylene-ethylene trichloride solution until a smooth consistency is reached. The dispersion is preferably accomplished by means of a high speed mixer such as the Eppenbach Homo Mixer. Nylon cloth is run through a bath of the above dispersion and surplus material is removed from the surface by means of a scraper. The impregnated cloth is then run into a ventilated and heated tower at a temperature sufficient to drive off the solvent but insufficient to cause fusion of the thermoplastic particles. The film is then passed into a 200° C. zone where the controlled fusion takes place in 30 seconds. The film is then cooled by a blast of air and passed through a testing device to determine the presence of any holes due to insufficient impregnation of the fabric. The next stage is to subject the impregnated nylon cloth to vapors of ethylene trichloride and a continuous spray of condensed ethylene trichloride liquid to dissolve out the polyisobutylene. The resulting microporous film is then dried and ready for use.

*Example 2.*—15 parts by weight of a polydimethyl siloxane elastomer gum (General Electric Co., "Silicone Gum—SE 76") having a viscosity of about 100,000 centipoises at 250° C. is dissolved in 55 parts by weight of ethylene trichloride to form a silicone-ethylene trichloride solution. 30 parts by weight of finely divided monochlorotrifluoropolyethylene particles, with about 98 percent of the particles passing through a 200 mesh screen and about 94 percent passing through a 325 mesh screen, are then thoroughly dispersed throughout the silicone-ethylene trichloride solution until a smooth consistency is reached.

The same procedure for mixing the components and forming a microporous film is used in this example as in Example 1, except that the particles of monochlorotrifluoroethylene are used in place of the polyvinyl chloride particles, and in addition the fusing operation takes place for 40 seconds at about 250° C.

*Example 3.*—100 parts by weight of a low molecular weight polyisobutylene oil having a viscosity of 3 million centipoises at 25° C. is dissolved in 50 parts by weight of an aliphatic hydrocarbon mineral spirits solvent. 100 parts by weight of finely divided polyvinyl chloride particles is then thoroughly dispersed throughout the polyisobutylene solution until a smooth consistency is reached. The dispersion is then knife-coated onto a suitable nylon cloth. The film is then heated to a temperature below the fusion point of the polyvinyl chloride particles to drive off the solvent. It is then heated for 30 seconds in circulating air at 400° F. to effect fusion of the polyvinyl chloride particles. The film is then cooled and soaked a short time in mineral spirits to remove the continuous phase polyisobutylene.

The above dispersion can also be directly knife-coated on a battery plate and then fused and leached out as above.

*Example 4.*—200 parts by weight of a finely divided monochlorotrifluoropolyethylene powder is thoroughly dispersed throughout 100 parts by weight of a pure di-functional methylsiloxane polymer having a viscosity of 6 million centipoises at 25° C. The dispersion is then calendered in a film of the desired thickness onto a polyethylene film release surface. The film is then heated in hot turbulent air at 500° F. for 40 seconds. The fused film is then skeletonized by running it through hot vapors of trichloroethylene to remove the continuous phase siloxane polymer. The film is then easily stripped from the release surface and ready for its subsequent application.

*Example 5.*—100 parts by weight of a finely divided polyvinyl chloride powder are thoroughly dispersed throughout 100 parts by weight of soluble polymethylsiloxane having a viscosity of about 5 million centipoises at 25° C. The dispersion is then heated to approximately 400° F. for 30 to 60 seconds. The fused film is then washed with aromatic or chlorinated hydrocarbons which quickly remove the continuous silicone phase and the film is then ready for its desired use.

Figure 2:
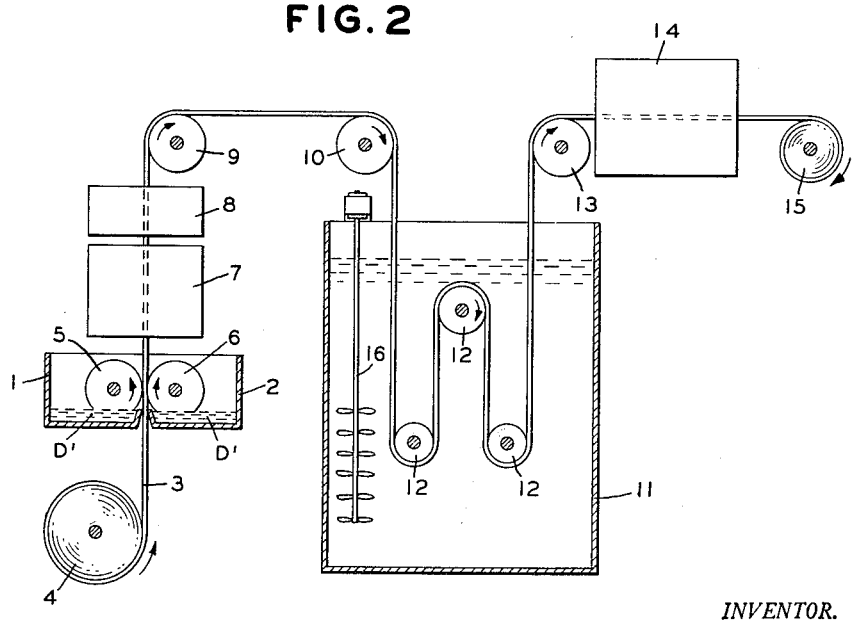

An advantage of the present invention is that the process can be easily adapted for the continuous production of microporous films in strip or web form which may be cut to the desired form for subsequent use, as is illustrated in the drawings in which:

FIGURES 1 and 2 are schematic elevational views showing two embodiments of apparatus for carrying out the continuous process of the present invention.

The embodiment shown in FIGURE 1 is adapted for producing microporous films from very viscous dispersions capable of being calendered. A film forming composition formed according to the present invention comprising finely divided thermoplastic particles dispersed throughout a highly viscous inert matrix material is prepared by milling the two components together on a standard rubber roll. The formed microporous film forming composition D is fed into the calender 1 by suitable means between the calender rolls 2 and 3. A backing strip 5 is continuously fed from a supply roll 6 by suitable means in between the calender rolls 3 and 4. As the film forming composition D is squeezed between the rolls 2 and 3 a thin film 7 of the composition D is formed on the outer periphery of the roll 2. As the film 7 contacts the backing strip 5 it is transferred to the backing strip 5. The thickness of the film 7 deposited on the backing strip 5 may be controlled by adjusting the distance between the rolls 2, 3 and 4. The coated backing strip then leaves the calender and is directed through a heating chamber 8 which is heated to a sufficient temperature by means of infrared lamps 9 to effect fusion of the thermoplastic particles. After leaving the fusion chamber 8 the fused film is directed over a guide roller 10 and into a leachout tank 11, which contains hot vapors of a solvent or a liquid solvent for the matrix material, to leach out the inert matrix material. The fused film is run over a series of rollers 12 in the leachout tank 11 to insure sufficient contact of the matrix material with the solvent. After leaving the leachout tank 11, the microporous strip is directed over a guide roller 13 and then wound on a roll 14 ready for subsequent use.

The backing strip 5 may be a cloth such as nylon or a solid film such as a polyethylene film. If a cloth is used, the film 7 may be squeezed into the cloth to impregnate it by setting the distance between the rolls 3 and 4 equal to or approximately equal to the thickness of the backing strip 5, in which case the backing strip 5 will form a permanent reenforcing member for the microporous film produced. If the backing strip 5 is a polyethylene film to be used as a release surface, the desired thickness of the film 7 may be regulated by adjusting the rolls 2, 3 and 4, and the film 7 deposited on top of the backing strip 5. The microporous film thus formed may be wound on the roll 14 along with the backing member and stripped from the backing strip when desired, or it may be stripped therefrom during the continuous process and wound on a separate roll.

The embodiment shown in FIGURE 2 is adapted for producing microporous films by applying a thin dispersion to a backing strip. When carrying out the continuous process with this apparatus a microporous film forming composition is formed according to the present invention by dispersing finely divided thermoplastic particles throughout a highly viscous continuous matrix material and adding thereto a suitable solvent for the matrix material, which is not a solvent for the thermoplastic particles. This thin dispersion $D_1$ is placed in two tanks, 1 and 2. A suitable porous backing strip 3, preferably a cloth strip, is continuously fed between two applicator rolls 5 and 6 from a supply roll 4. The rolls 5 and 6 continuously run through the coating composition $D_1$, in the tanks 1 and 2, as shown, and impregnate the backing strip 3 with the coating composition $D_1$ as it passes between the applicator rolls 5 and 6. The impregnated backing strip is then directed through a first heating chamber 7 which is heated to a temperature sufficient to drive off the solvent but insufficient to fuse the thermoplastic particles. The dried impregnated strip is then passed through a second heating chamber 8 which is heated to a temperature sufficient to fuse the thermoplastic particles. The heating chambers 7 and 8 may be heated by any suitable means such as by electrical resistance elements. The fused film and backing strip then leaves the heating chamber 8 and is directed over guide rolls 9 and 10 into a leachout tank 11 which contains a solvent for the matrix material. The fused film is submerged in the solvent by passing it over a series of rollers 12 in the leachout tank 11. The formed microporous film and backing strip then passes out of the leachout tank 11, over a guide roll 13, and into a drying chamber 14 to dry the film. It is then wound on the roll 15 ready for subsequent use. A stirrer 16 provides turbulence for the solvent to aid in the leachout operation.

In both of the above-described embodiments the timing of the fusing operation and leachout operation can easily be controlled and correlated by varying the speed of the backing strip, the length of the heating or fusion chambers and by varying the number of rolls in the leachout tank.

The following examples more specifically illustrate the continuous method of the present invention:

*Example 6.*—66.7 parts by weight of monochlorotrifluoropolyethylene powder having a uniform particle size of about two microns is thoroughly dispersed throughout 33.3 parts by weight of a dimethyl polysiloxane linear polymer having a viscosity of 2 million centipoises at 25° C. by milling the two components together on a standard rubber roll. The microporous film is then made, having a backing member attached thereto by employing the apparatus as shown in FIGURE 1. The dispersion as prepared above is first calendered by means of rollers 2 and 3 and squeezed into a continuously moving nylon strip of 0.005 inch in thickness by continuously passing the nylon strip and the calendered dispersion between the two rollers 3 and 4 having a setting of 0.005 inch. The continuously moving impregnated nylon strip is then passed into the heating chamber 8 where it is exposed to infrared heat for one minute at a temperature of 250° C., to effect fusion of the monochlorotrifluoropolyethylene particles. The fused film is then run over the roll 10 and into the chamber 11 containing hot vapors of trichloroethylene and run over a series of rollers 12 in the vapor chamber for a period of about 5 minutes during which time the polysiloxane continuous phase is effectively removed. The nylon strip then leaves the leachout chamber and is reeled up on the roller 14 as a finished product ready for slitting for subsequent application.

*Example 7.*—25 parts by weight of polyisobutylene having a viscosity of one million centipoises at 25° C. is dissolved in 50 parts by weight of an aliphatic hydrocarbon mineral spirits solvent. 25 parts by weight of a finely divided polyvinyl chloride is then thoroughly dispersed throughout the polyisobutylene solution. The microporous film is then made having a backing member attached thereto by employing the apparatus as shown in FIGURE 2. A nylon backing cloth is continuously run from the reel 4 between the two rollers 5 and 6, which rollers also continuously run through baths 1 and 2 of the above formulation to impregnate the nylon cloth. The impregnated cloth is then run through the heating chamber 7 which is electrically heated to a temperature of about 150° C. to drive off the mineral spirits solvent, but insufficient to fuse the resin particles, and subsequently to another heating chamber 8, which is electrically heated to 200° C. to effect fusion of the polyvinyl chloride particles. The movement of the impregnated nylon backing strip is so regulated that it takes approximately 30 seconds to move through the second heating chamber. The nylon cloth carrying the fused polyvinyl chloride particles is then passed into the tank 11 where it is submerged in aliphatic-hydrocarbon mineral spirits by running it over a series of rollers 12 in the tank for about 5 minutes to leach out the polyisobutylene. The film is dried at low heat by passing it through the drying chamber 14, then reeled up on the roll 15 ready for use.

The method of the present invention produces microporous films of uniform porosity and density without practical limitation as to the particle size of the resinous materials used to form the films and also without practical limitation on the thickness of the films. The films produced have been found to be highly permeable and to have a pore structure which is ideally suited to the passage of an electrolyte. They are advantageously useful as battery separators. The percentage of voids in the films range as high as 70% and above while maintaining good mechanical strength in the film.

A battery separator must be a nonconductor of electricity and must be chemically inert in the battery fluid. Thus the particular thermoplastic resin used to form the microporous films of the present invention, if the resulting film is to be used as a battery separator, must be chosen with these facts in mind. The resins herein disclosed are sufficiently non-conductive for use as battery separators. However, the resins also have varying resistance to acids and alkalies. Polyamides, polytrifluoromonochloroethylene, polytetrafluoroethylene, polyethylene, vinylidene chloride, chlorinated rubber, polystyrene-butadiene polystyrene, polyvinyl chloride, polyvinyl chloride-acetate, polyvinyl-acetate, ethyl cellulose, methyl methacrylate, and acrylate resins are suitable materials which are sufficiently resistant to alkali to be used as separators in an alkaline type battery. Some examples of resins suitable for use in an acid type battery are polyvinyl chloride, polyvinylchloride acetate, polystyrene, chlorinated rubber, polyethylene, vinylidene chloride, polyamides, polytrifluoromonochloroethylene, and polytetrafluoroethylene and the like.

I claim:

1. The method of making microporous films which comprises sufficiently heating finely divided thermoplastic particles to cause fusion thereof while the particles are thoroughly dispersed throughout a continuous inert medium having a viscosity from about 20,000 centipoises to about 2,000,000 centipoises at the temperature used to cause such fusion and then dissolving out the inert medium.

2. The method of making microporous films which comprises sufficiently heating finely divided thermoplastic particles to cause fusion thereof while the particles are thoroughly dispersed throughout a continuous inert medium having a viscosity from about 50,000 centipoises to about 500,000 centipoises at the temperature used to cause such fusion and then dissolving out the inert medium.

3. The method of making microporous films which comprises dispersing finely divided thermoplastic particles throughout a continuous phase, inert and incompatible matrix medium, said thermoplastic particles comprising from about 30% to about 75% by volume of the total mixture, heating the dispersion sufficiently to cause fusion of the thermoplastic particles and then dissolving out the inert medium, said inert medium having a viscosity from about 20,000 centipoises to about 2,000,000 centipoises and being inert, incompatible, and in a continuous phase at the temperature used to cause fusion of the thermoplastic particles.

4. The method of making microporous films which comprises dispersing finely divided thermoplastic particles of from about 1 to 10 microns size in a continuous phase, inert and incompatible matrix medium, said thermoplastic particles comprising from about 30% to about 50% by volume of the total thermoplastic particles and inert medium, heating the dispersion sufficiently to cause fusion of the thermoplastic particles, and then dissolving out the inert medium, said inert medium having a viscosity from about 50,000 centipoises to about 500,000 centipoises and being inert, incompatible, and in a continuous phase at the temperature used to cause fusion of the thermoplastic particles.

5. The method of making microporous films which comprises dissolving polyisobutylene having a viscosity from about 20,000 to about 2,000,000 centipoises at about 200° C. in a solvent for the polyisobutylene, thoroughly dispersing throughout the polyisobutylene solution a polyvinylchloride resinous powder having a particle size of from about 1 to 10 microns, evaporating off the solvent for the polyisobutylene to produce a dispersion in which the polyisobutylene phase is continuous, heating the dispersion to a temperature of about 200° C. while the polyisobutylene remains inert and in a continuous phase to effect fusion of the polyvinylchloride particles, and then dissolving out the continuous polyisobutylene phase with a solvent which is not a solvent for the polyvinylchloride.

6. The method of making a microporous film which comprises dissolving a soluble silicone elastomer gum having a viscosity from about 20,000 to about 2,000,000 centipoises at about 250° C. in a solvent for the silicone gum, thoroughly dispersing throughout the silicone solution a monochlorotrifluoropolyethylene resinous powder having a particle size of from about 1 to 10 microns, evaporating off the solvent for the silicone gum to produce a dispersion in which the silicone gum phase is continuous, heating the dispersion to a temperature of about 250° C. while the silicon elastomer remains inert and in a continuous phase to effect fusion of the monochlorotrifluoropolyethylene particles, and then dissolving out the continuous silicone phase with a solvent which is not a solvent for the monochlorotrifluoroethylene.

7. The method of forming a microporous film which comprises applying to a backing material a composition comprising finely divided thermoplastic particles dispersed throughout an inert, highly viscous medium and in which the inert medium phase is continuous, together with a solvent for the inert medium which solvent is not a solvent for the thermoplastic particles, evaporating the solvent from the composition, heating the composition to cause fusion of the thermoplastic particles, and dissolving out the inert medium, said medium being inert and continuous at the temperature used to fuse the thermoplastic particles, and having a viscosity from about 20,000 centipoises to about 2,000,000 centipoises at the fusion temperature of the thermoplastic particles.

8. The method of continuously making microporous film which comprises applying to a continuously moving backing strip a continuing film of a composition comprising thermoplastic particles dispersed throughout a continuous inert matrix medium, continuously moving the backing strip and applied film through a heating chamber to cause fusion of the thermoplastic particles, and then through a leachout tank containing a solvent for the matrix material to dissolve the matrix material, said inert medium having a viscosity from about 20,000 centipoises to about 2,000,000 centipoises and being inert, incompatible and continuous at the temperature used to cause fusion of the thermoplastic particles.

9. The method of continuously making a microporous film reinforced by a backing member which comprises impregnating a continuously moving porous backing strip by squeezing into the backing strip a composition comprising finely divided thermoplastic particles dispersed throughout a continuous inert matrix material, continuously moving the impregnated backing strip through a heating chamber to cause fusion of the thermoplastic particles and then moving the fused impregnated backing strip through a leachout tank containing a solvent for the matrix material to dissolve out the matrix material, said inert medium having a viscosity from about 20,000 centipoises to about 2,000,000 centipoises and being inert, incompatible and continuous at the temperature used to cause fusion of the thermoplastic particles.

10. The method of continuously making microporous films reinforced by a backing member which comprises impregnating a continuously moving porous backing strip with a composition comprising finely divided thermoplastic particles dispersed throughout a continuous inert matrix material, dissolved in a solvent for the matrix material which solvent is not a solvent for the thermoplastic particles, continuously moving the impregnated backing strip through a first heating chamber to drive off the solvent and dry the impregnated film, continuously moving the dried impregnated backing strip through a second heating chamber to fuse the thermoplastic particles, and then moving the backing strip carrying the fused thermoplastic film through a leachout tank containing a solvent for the matrix material to dissolve out the matrix material, said inert medium having a viscosity from about 20,000 centipoises to about 2,000,000 centipoises and being inert, incompatible and continuous at the temperature used to cause fusion of the thermoplastic particles.

11. The method of making microporous films which comprises thoroughly dispersing finely divided thermoplastic particles in a continuous, incompatible, inert matrix medium, heating the mixture to a temperature sufficient to fuse the thermoplastic particles, said matrix medium being inert, incompatible and in a continuous phase at a temperature used to cause fusion of the thermoplastic particles, and then dissolving out the inert medium.

References Cited in the file of this patent

UNITED STATES PATENTS

| | | |
|---|---|---|
| 2,356,025 | Bergamini | Aug. 15, 1944 |
| 2,413,498 | Hill | Dec. 31, 1946 |
| 2,433,910 | Johnson | Jan. 6, 1948 |
| 2,442,940 | Staudinger et al. | June 8, 1948 |
| 2,567,108 | Hochberg | Sept. 4, 1951 |
| 2,644,802 | Lontz | July 7, 1953 |
| 2,670,500 | Ensslin | Mar. 2, 1954 |
| 2,676,927 | McCurdy et al. | Apr. 27, 1954 |
| 2,745,141 | Brennan | May 15, 1956 |
| 2,762,784 | Foust et al. | Sept. 11, 1956 |
| 2,806,256 | Smith-Johannsen | Sept. 17, 1957 |